Feb. 27, 1934.    McKINLEY STOCKTON    1,948,949
WEAR RESISTING BLOWER ROTOR BLADE
Filed Nov. 26, 1932
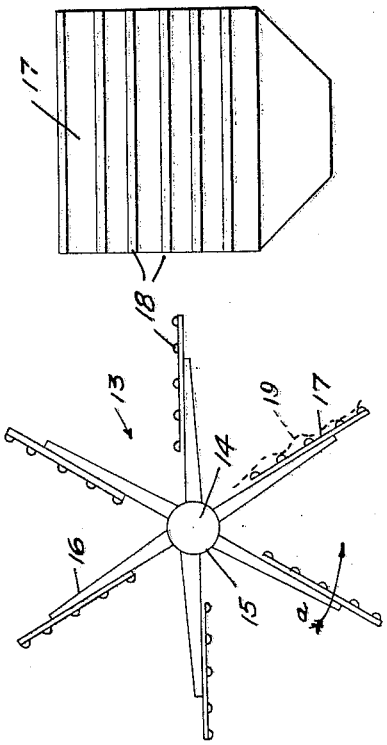
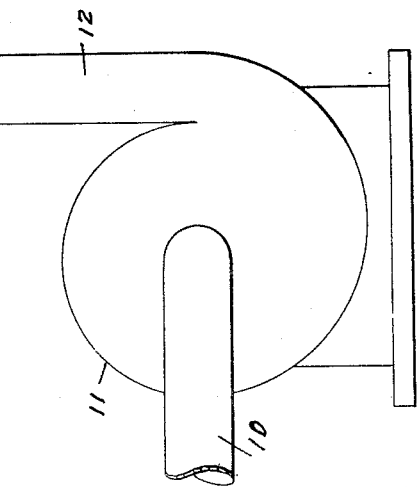
INVENTOR.
McKINLEY STOCKTON
BY James M. Abbott
ATTORNEYS.

Patented Feb. 27, 1934

1,948,949

UNITED STATES PATENT OFFICE 1,948,949

WEAR RESISTING BLOWER ROTOR BLADE

McKinley Stockton, Los Angeles, Calif., assignor to The Dicalite Company, Los Angeles, Calif., a corporation of Delaware Application November 26, 1932
Serial No. 644,545

3 Claims. (Cl. 302—37)

This invention relates to means for moving finely divided materials suspended in a fluid and particularly pertains to improvements in blower constructions.

In various industries, such for example as in plants working diatomaceous earth and the like, clay products are milled and otherwise treated. In such operations it is customary to handle a powdered and partially powdered material while suspended in a flowing stream of air, and in order to produce a flow of air in proper volume and velocity paddle wheel blowers are ordinarily used, the blowers acting to produce a milling action of the finely divided particles of the product, as well as to provide means for causing a flow of air with the product suspended therein. In blowers of this type used for the aforesaid purpose it has been found that, even though the product is of microscopic fineness and relatively soft, it acts upon the blades of the fan rotor to produce a scouring and abrasive action as the product passes through the blower whereby the blades of the rotor of the blower are rapidly worn away, thus requiring their frequent replacement.

It is the principle object of the present invention to provide a rotary blower of the radial impeller blade type, into the center of which air and finely divided material are fed and from the periphery of which the material is projected, the impeller being so designed as to materially reduce abrasion of the impeller blades, whereby their life is materially prolonged.

The invention is illustrated by way of example in the accompanying drawing in which:

Figure 1 is a view in side elevation showing a blower of the type with which the present invention is concerned.

Fig. 2 is an enlarged view showing a rotor of the type disposed within the blower housing.

Fig. 3 is an enlarged view in elevation showing the surface of one of the blades and the construction with which the present invention is particularly concerned.

Referring more particularly to the drawing, 10 indicates a conduit communicating with the center of a fan housing 11. A tangentially disposed outlet conduit 12 also communicates with the housing. Mounted within the housing 11 is a rotary impeller 13 which is carried on a rotor shaft 14. The details of the impeller construction are more clearly shown in Fig. 2 of the drawing where it will be seen that a hub 15 is mounted on the shaft 14 and carries a plurality of spider arms 16, each of which arms is fitted with a paddle blade 17. The blades, as more clearly shown in Fig. 3, are flat and are relatively wide as compared with their radial length. Due to this construction it will be seen that air and material entering at the center of the blower housing 11 through the conduit 10 will revolve 60 with the impeller and will move from the center of the impeller 13 toward the tips of the blades 17.

When a fan blower of the type described is continuously supplied with solid particles suspended in the air stream induced by the action of the fan, centrifugal force tends to move the solid particles in straight lines radiating from the axis of rotation. As the fan rotates, every point on the advancing face of each blade is continuously crossing these radial lines of movement at a velocity which increases with the distance of the point from the axis of rotation. The blade is therefore continuously encountering the solid particles in a direction normal to the direction in which they are moving.

On encountering the advancing face of the blade, the solids are pressed against it with a force which is measured by the inertia of the particle and the rotative speed of the blade at the point of encounter. The particles striking the blade are urged by centrifugal force to continue their movement away from the axis of rotation, and can do so only by sliding along the advancing face of the blade under a pressure which increases as the particle moves along the blade face toward the tip and also as the rotative speed of the fan as a whole increases. In the high speed fans used for moving and milling diatomaceous earth this pressure is relatively high.

This sliding movement under pressure accounts for the well known rapid rate of wear of fan blades discharging air-suspended solids and also for the increased wear toward the tip of the blade. This wear is particularly severe in the case of diatomaceous earth products because of the extreme sharpness and abrasive character of the siliceous particles of which they are composed.

I have discovered that by providing the advancing face of the blade with one or more ridges or beads in a position parallel to the axis of rotation, the wear upon the face of the blade may be greatly reduced, for reasons which will hereinafter be set forth.

In actual practice four or five parallel ridges or projections are formed across the face of the blade and are spaced at a distance from each other which has a definite relationship to the rotating speed of the impeller and the velocity of the material passing through the blower. Such ridges are indicated at 18 in the drawing from which it will be noted that the ridges have a rounded or semicircular section. These ridges may be formed as part of the metal blade or may be welded across the face thereof by any suitable welding machine. In some instances the blades have been cast with the beads upon them and have proven more satisfactory since a smoother surface is obtained upon the beads and there is liable to be less disturbance to the air currents and therefore less loss of efficiency through eddy currents and the like. The action of the particles upon the ridges cause the ridges to wear excessively but due to the added thickness at these points the wear is less detrimental than wear occurring on a flat surface.

In operation of the present invention air with finely divided solid particles carried in suspension thereby is delivered through the pipe 10 to the blower housing 11 and is introduced at the center of the impeller 13. Here the material is struck by the blades 17 and due to centrifugal action the material in the air flows outwardly along the blades and through the pipe 12 to other suitable apparatus in the plant. As the solid particle of suspended material moves outwardly along the blade it will substantially follow the path indicated in dotted lines and designated by the numeral 19 in Fig. 2. Here it will be seen that as the material encounters the first innermost bead or ridge 18 the material is thrown outwardly from the face of the blade and in the direction of travel of the blade, it being assumed that the impeller is rotating in the direction of the arrow "a" as indicated in Fig. 2. At the same time the material moves radially due to centrifugal force. The blade in its movement overtakes the particle of material and will cause the blade to strike the material at a point nearer the outer edge of the blade. This point will be represented by the next ridge or bead, after which the material will follow a succession of trajectories until the material is thrown from the tip of the blade by centrifugal force. The beginning and ending points of the various trajectories may be made to agree with the location of the beads upon the blade. It will be evident that the points of forcible impact of the material with the surface of the blades will be coincident with the position of the ridges so that the abrasive action of the material will take place mainly upon the ridge portions 19 of the blades 17 and to a less extent upon the body of the blades.

It will thus be seen that the impeller blades here disclosed embody simple and inexpensive means to resist wear of suspended solid particles moving in a fluid body.

While I have shown the preferred form of my invention as now known to me it will be understood that various changes may be made in the combination, construction, and arrangement of parts, as known to me, without departing from the spirit of the invention as claimed.

Having thus described my invention, what I claim and desire to secure by Letters Patent is:

1. A rotary blower including a housing, an impeller rotatably supported therein, said impeller having blades; an induction pipe by which air and suspended solid particles are introduced at the center of the housing and adjacent the axis of the impeller; an eduction pipe connected with the housing and arranged tangentially thereof, and ridges of arcuate section extending across the advancing faces of said blades for preventing direct radial movement of the solid particles along the face of the blade.

2. In a blower structure including a housing and a rotary impeller therein, blower blades on said impeller, said blades being formed with spaced parallel ridges extending across the impact face of the blades and parallel to the rotary axis of the impeller, each said ridge being in cross section substantially a segment of a circle.

3. In a blower construction of the rotary impeller type, radial blades upon the impeller, said blades having a flat working surface outwardly along which solid particles may move as the impeller rotates, and a plurality of spaced ridges on the working face of the blade and projecting therefrom, said ridges being parallel to each other and to the rotating axis of the impeller and being of curved sectional contour.

McKINLEY STOCKTON.